Nov. 24, 1925.
J. B. TYTUS
SHEARS
Filed Oct. 11, 1923
1,562,931
2 Sheets-Sheet 1
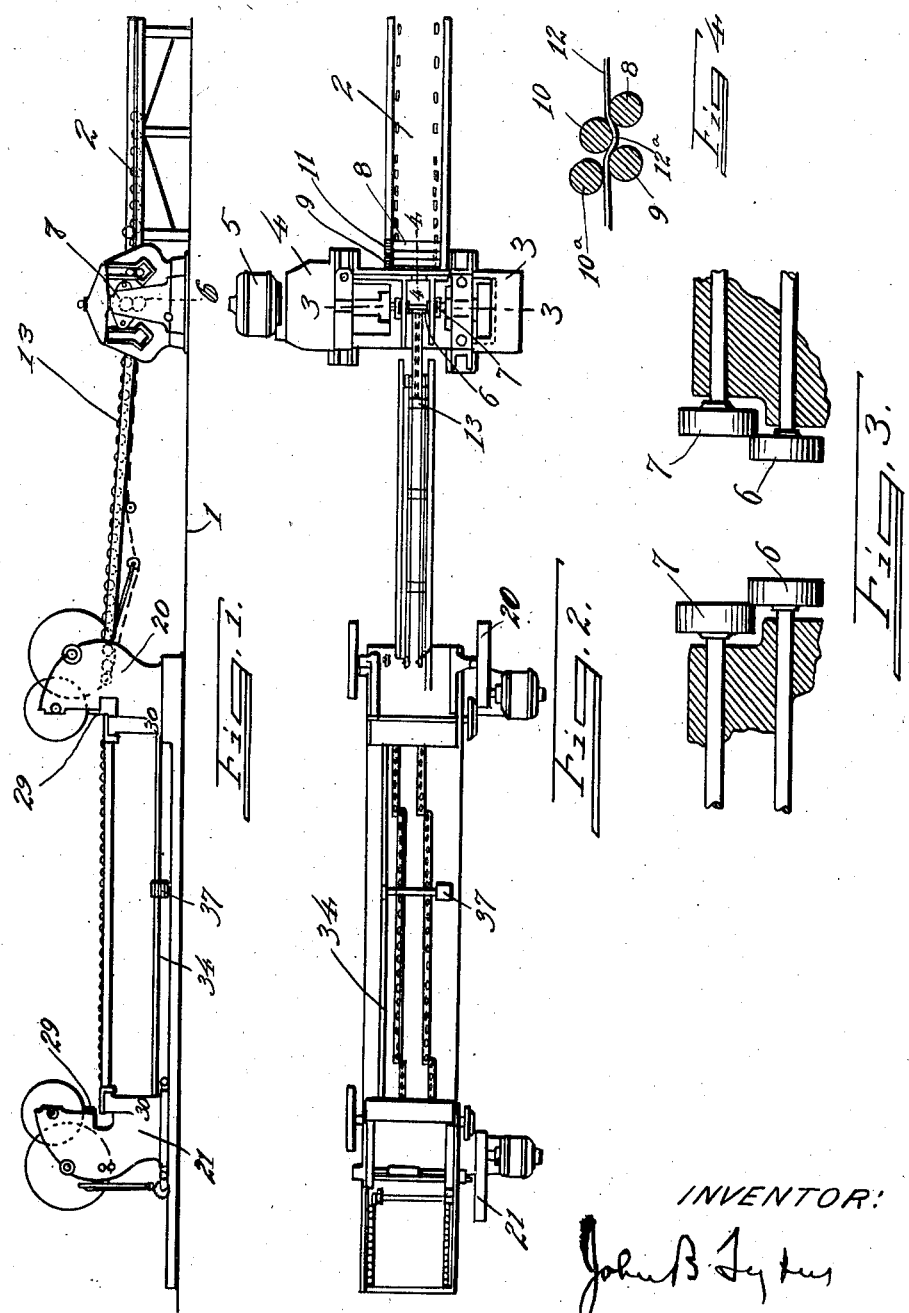
INVENTOR:
John B. Tytus
BY
ATTORNEYS.

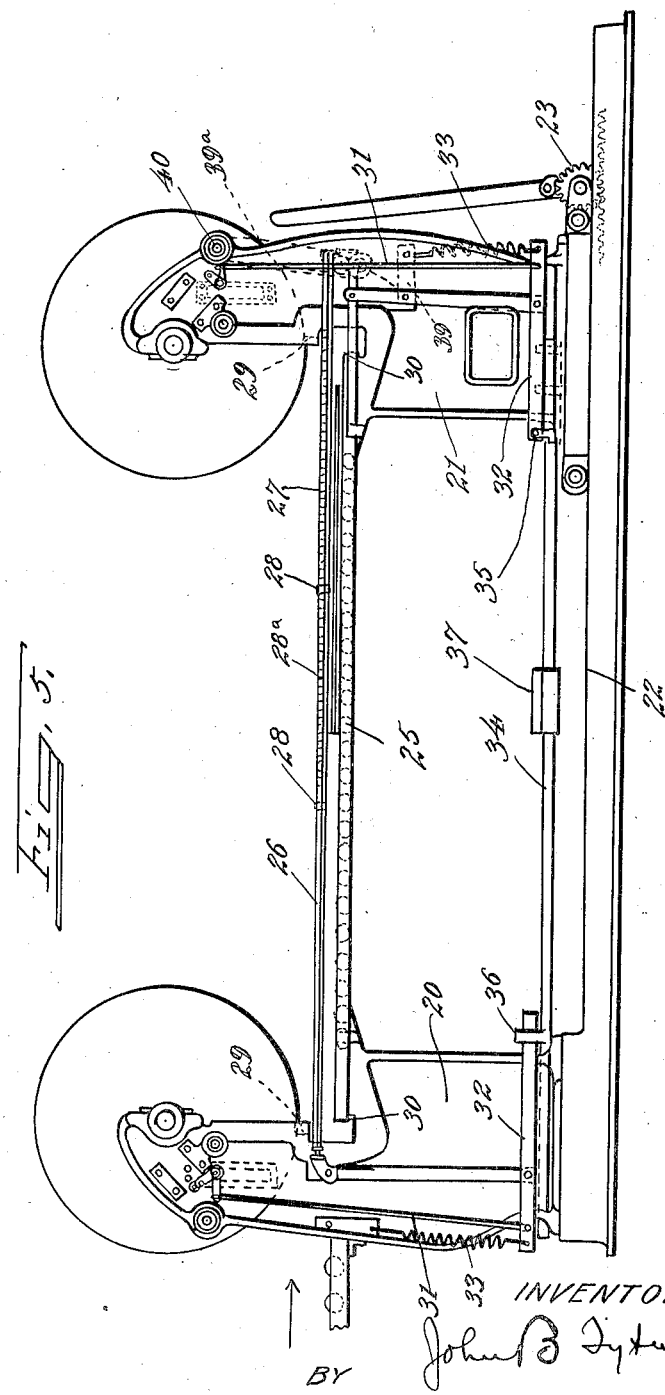

Patented Nov. 24, 1925.

1,562,931

UNITED STATES PATENT OFFICE.

JOHN B. TYTUS, OF MIDDLETOWN, OHIO, ASSIGNOR TO THE AMERICAN ROLLING MILL COMPANY, OF MIDDLETOWN, OHIO, A CORPORATION OF OHIO.

SHEARS.

Application filed October 11, 1923. Serial No. 667,827.

*To all whom it may concern:*

Be it known that I, JOHN B. TYTUS, a citizen of the United States, and a resident of Middletown, in the county of Butler and State of Ohio, have invented certain new and useful Improvements in Shears, of which the following is a full, clear, and exact description, reference being had to the accompanying drawings, forming part of this specification.

My invention relates to slitting and trimming shears as employed in the rolling mill for trimming or slitting off the side edges, and trimming off the irregular ends of sheets of metal.

The operation of trimming and slitting sheet metal, as carried on in the past, has been slow, relatively to other operations, and usually requires the use of very large and cumbersome machinery in order to accomplish a speedier operation.

It is the object of my invention to provide a mechanism, which operates on one sheet at a time, and acts to square up the sheet, hold it against canting and at the same time trim the edges by slitting away all metal over the required width, and which then moves the sheet to another shears which at a single operation cuts off both ends to a desired length of the piece.

Among other devices which are employed by me in my mechanism are devices new in the art for holding a sheet so that it moves in a perfectly straight line, from which it cannot deviate, during the edge slitting operation, and the placing of the end trimming mechanism so that the operation of slitting the side edges of the sheet takes place while the sheet is being fed to the end trimmer.

I adjust the spacing of the double side trimming or slitting wheels by bodily shifting the position of one of the housings and in the same manner adjust the spacing of the end trimmers.

My various objects and advantages, I accomplish by that certain construction and arrangement of parts to be hereinafter more specifically pointed out and claimed.

In the drawings:

Figure 1 is a side elevation of the complete device.

Figure 2 is a top plan view of the complete device.

Figure 3 is a detail view of the slitting knives, as on line 3—3 of Figure 2.

Figure 4 is a detail diagrammatic section showing the gripping rolls, as on the line 4—4 of Figure 2.

Figure 5 is a view on a larger scale of the end trimming shears.

I have illustrated the entire device as mounted on the mill floor 1. There is a roller table or other delivery means for the sheets as at 2, on which the operators set the sheets at the beginning of the operations. There are two housings, 3, 4, for the slitting shears, these housings of the usual construction of shear housings, and having a drive from the motor 5. The housing 4 is adjustable by any desired means, away from the housing 3, the drive shafts being of telescoping character (not shown). I do not claim any novelty in arranging two slitting shears to move bodily with relation to each other, and any desired form of housing and shifting arrangement may be provided.

The cutters are in the form of disks 6 and 7, arranged in pairs on each side of the slitting space between the housings and the sheet rides in over the lower disks 6, and is sheared against the outer edges of the disks 6 and the inner edges of the disks 7.

It has always been found quite difficult to guide a sheet of metal between a pair of rotary trimming shears as inside edge trimming, because of the tendency of the sheet to move out of a straight line. Thus the cutting disks have to be ground, and if they happen to be a little smaller on one side of the cutting space than on the other, the feeding action of the disks themselves will not be in a straight line. Other features also contribute to this irregularity of feed, such as a slight difference in gauge at one edge of the sheet than at the other, and such as a slightly different relative positioning of the disks in either pair.

I have provided, however, a device which enforces a rectilinear path to the sheet while being slit or side edge trimmed.

At a position as close as practical to the cutting disks, I locate a series of rollers, of which I have shown three, this being sufficient, between which the sheet must pass. These rollers are arranged so as to cause the sheet to bend down between them, thereby giving a large surface contact therewith with the several rollers.

I have illustrated three rollers 8, 9 and 10, of which the roller 10 lies between the other two, with its periphery below the level of the peripheries of the other two rolls. The three rolls are driven by means of gears 11, so that the pair revolve in the same direction and the intermediate roll revolves in opposite direction, or any two of the three rollers may be driven. As indicated in Figure 4, the sheet 12, is fed positively forward to the shears by all the rolls, and it is caused to bend down as at 12ª, thereby providing for a strong grip on the sheet. To bend the sheet back, a roll 10ª is provided or some other guide to prevent the sheet from feeding at an angle.

By use of this staggered roll arrangement, I find that I can positively insure that a sheet while passing through the rolls will be fed so that each portion passes through the arranged rolls, in a direction at right angles to their axes, so that by starting the sheet straight, it will always remain straight with relation to the cutting disks.

From the cutting disks, the sheet passes along an intermediate table formed of rollers 13, which table is here set at a slant, to carry the sheet up to the end trimming device. The speed at which the sheet is projected along this table carries it well between the simultaneously operating end trimmers.

I am not aware of any one in the past endeavoring to trim both ends of a sheet at the same time, and by doing so, I save a great deal of time, labor and material. I show two shear housings 20 and 21, of which the housing 21 is mounted to move along the base or track 22, by means of a cog wheel device 23, as is customary in adjustable shear housings. The other housing is fixed and since the two cutting lines of the housing can be predetermined, the operator can shift the piece endwise until he gets it so positioned that the trimming will remove the scrap at both ends of the sheet simultaneously, without running the danger of making so deep a trim at one end that the scrap at the other end will not lend sufficient good metal to give the required length.

Secured to the two housings, and extending parallel with the table 25 between them, are rods 26, 27, of which the one has loops 28 thereon, to engage over the other. These rods are calibrated so as to indicate the distance apart of the cutting blades of the two shears, and as they are connected fast to the housings, the reading is best taken where a mark (not shown) on the end of the rod 26, lies against the scale 28ª on the rod 27. This mechanism provides for quick setting of the shear and reduces chances of error on the part of the operator in applying a ruler or tape.

I have shown the trim mechanisms for the clutches of the two shears, by means of which the upper shear blades 29, are brought down past the lower shear blades 30, in the form of push rods 31. These rods when pushed upwardly serve to operate the usual mechanism for applying thrust to the upper shear blades. The tripper and treadles shown are of any standard design.

Each tripper rod is mounted on a lever 32, these two levers being held in normal position by means of springs 33. A treadle bar 34, extends along beneath the bed of the machine between the two levers, and is secured pivotally at 35 to the one on the movable shear housing, and has a loop 36 on its other end, which engages fairly loosely over the lever 32 on the fixed shear housing.

A depression of the treadle bar, as by applying the foot to the step 37 thereon, acts to trip both shear blades at once. The sheets are fed one at a time or if found desirable, several at a time, from the side trimming shears, along the slanting table described and onto the table of the end trimming shears last above described.

The operator pushes them along until they come into desired position, and then trips both shears simultaneously. The sheet is then trimmed to an absolute length, and the operator then pushes the end of the sheet to engagement with the feed out rolls. These rolls are shown at 39, and are driven by a belt 39ª, from the driven shaft 40 at the top of the shear housing in question.

The shearing operation for trimming the end requires the use of but one man, to handle the sheets as rapidly as they are side trimmed. A crew is necessary for the side trimming shears, when the sheets must be lifted from a truck and placed on the feed table leading to the trimming shears, but two or three men are usually sufficient to handle this end of the operation.

The machine described gives much greater production with the same labor, as other sheet trimmers, gives more accurate trimming, and saves loss in spoiled pieces or wasters.

Having thus described my invention, what I claim as new and desire to secure by Letters Patent, is:—

1. A shears for trimming the ends of metal sheets comprising a pair of housings adjustable with relation to each other, and having shear blades therein, a table to support a sheet between said housings, a gauge secured to the two housings, and calibrated to indicate the spacing between the shear blades of the two housings, and means for setting into operation the shear blades of both housings, said means comprising a common control member.

2. A shears for trimming metal sheets comprising a pair of housings adjustable with relation to each other, a table for supporting a sheet between said two housings, a stop on one housing for the end of a sheet, and feed rolls driven to engage and grasp the sheet from a level beyond and below said stop, shear blades in the housings, and means to operate said blades to trim both ends of the sheet.

3. A cutting machine for trimming metal sheets, adapted to slit the said sheet while it is moving, and means to hold the sheet in a fixed alignment, during said slitting operation, comprising a set of rolls arranged in staggered relation in such a way as to cause the sheet to bend out of a single plane in passing between them.

4. A cutting machine for trimming metal sheets, adapted to slit the said sheet while it is moving, and means to hold the sheet in a fixed alignment during said slitting operation, comprising a set of rolls arranged in staggered relation in such a way as to cause the sheet to bend out of a single plane in passing between them, said rollers being driven to acomplish a feeding action on the sheet.

5. A cutting machine for trimming metal sheets, adapted to slit the said sheet while it is moving, and means to hold the sheet in a fixed alignment during said slitting operation, comprising a set of rolls arranged in staggered relation in such a way as to cause the sheet to bend out of a single plane in passing between them, said rollers being driven to accomplish a feeding action on the sheet, and located close to the slitting device of said shears.

JOHN B. TYTUS.